(12) United States Patent
Cho

(10) Patent No.: US 7,134,413 B2
(45) Date of Patent: Nov. 14, 2006

(54) METHOD FOR DETERMINING MALFUNCTION OF PRESSURE SENSOR

(75) Inventor: Joon Kwan Cho, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 11/302,084

(22) Filed: Dec. 12, 2005

(65) Prior Publication Data
US 2006/0142931 A1 Jun. 29, 2006

(30) Foreign Application Priority Data
Dec. 23, 2004 (KR) .................. 10-2004-0111262

(51) Int. Cl.
*F02M 1/00* (2006.01)
*F02B 77/08* (2006.01)
(52) U.S. Cl. .............. 123/179.17; 123/198 D
(58) Field of Classification Search ............ 123/198 D, 123/494, 479, 519, 518, 516, 520, 521; 73/118.1, 73/1.59
See application file for complete search history.

(56) References Cited

U.S. PATENT DOCUMENTS

| 4,928,242 | A | * | 5/1990 | Suzuki | 701/34 |
| 5,251,592 | A | * | 10/1993 | Seki et al. | 123/198 D |
| 5,590,634 | A | * | 1/1997 | Shinohara | 123/520 |
| 5,617,337 | A | * | 4/1997 | Eidler et al. | 702/104 |
| 5,808,189 | A | * | 9/1998 | Toyoda | 73/118.2 |
| 5,983,714 | A | * | 11/1999 | Izumiura et al. | 73/118.1 |
| 6,038,912 | A | * | 3/2000 | Isobe et al. | 73/1.59 |
| 6,148,803 | A | * | 11/2000 | Majima et al. | 123/520 |
| 6,474,148 | B1 | * | 11/2002 | Takagi et al. | 73/118.1 |
| 6,754,611 | B1 | * | 6/2004 | Nagashima et al. | 702/183 |

* cited by examiner

*Primary Examiner*—Carl S. Miller
(74) *Attorney, Agent, or Firm*—Morgan Lewis & Bockius LLP

(57) ABSTRACT

A method for determining a malfunction of a pressure sensor determines that a stick malfunction occurs in the pressure sensor by an ECU calculating a difference between a maximum value and a minimum value of a voltage value output from the pressure sensor mounted in a fuel tank and determining that a malfunction has occurred in a case that the difference is less than a predetermined value.

6 Claims, 2 Drawing Sheets

METHOD FOR DETERMINING MALFUNCTION OF PRESSURE SENSOR

CROSS-REFERENCE TO RELATED APPLICATION

This application claims priority to and the benefit of Korean Patent Application No. 10-2004-0111262 filed in the Korean Intellectual Property Office on Dec. 23, 2004, the entire contents of which are incorporated herein by reference.

BACKGROUND OF THE INVENTION (a) Field of the Invention

The present invention relates to a method for determining malfunction of a pressure sensor. More particularly, the present invention relates to a method for determining malfunction of a pressure sensor in a fuel tank.

(b) Description of the Related Art

Generally, a pressure sensor is mounted in a fuel tank for measuring a pressure of a fuel evaporation gas therein and detecting a leakage of the fuel tank. Evaporation gas in the fuel tank is captured in ordinary times and, when an engine starts, the evaporation gas is transmitted to a surge plenum and ignited in the engine.

Malfunctions of the pressure sensor mounted in the fuel tank include a malfunction by disconnection of a circuit of the sensor, a malfunction by a short, and a stick malfunction. The stick malfunction means that a voltage output from the sensor is locked up as one value because of an error occurrence of a current circuit in the sensor.

According to a method for determining malfunction of a pressure sensor of the prior art, the malfunction by a disconnection of a circuit of the sensor and the malfunction by a short can be determined but the stick malfunction cannot be determined.

Therefore, in a case that the fuel leaks from the fuel tank, when there is a stick malfunction the sensor determines that the fuel does not leak and thus the sensor outputs an error value. Therefore a problem occurs in that the leakage is not detected. In addition, in a case that the fuel does not leak from the fuel tank, when there is a stick malfunction the sensor determines that the fuel leaks and so the sensor outputs an error value. Therefore a problem occurs in that an engine warning lamp is erroneously turned on.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a method for determining a malfunction of a pressure sensor having advantages of detecting a stick malfunction of the pressure sensor.

An exemplary method for determining a malfunction of a pressure sensor detecting a pressure in a fuel tank and outputting a corresponding signal according to an embodiment of the present invention includes determining whether predetermined monitoring conditions are satisfied, determining whether a difference between a maximum value and a minimum value of output values output from the pressure sensor during a predetermined period is less than a predetermined value in a case that the predetermined monitoring conditions are satisfied, and determining that the pressure sensor is malfunctioning if a case that the calculated difference is less than the predetermined value successively occurs as much as a predetermined number of times.

The predetermined monitoring conditions include a case that an engine has been started, a case that respective intake air temperatures when the engine is starting and when the engine is operating are higher than or equal to a predetermined temperature, and a case that malfunction of an intake air temperature sensor does not exist.

In a further alternative embodiment of the invention a method for determining a malfunction of a pressure sensor in a vehicle fuel tank, includes steps of determining that certain monitoring conditions are satisfied, determining a maximum value and a minimum value output by the pressure sensor during a predetermined period, calculating a difference between the minimum and maximum values, comparing the calculated difference to a predetermined value, and determining that the pressure sensor is malfunctioning when that difference is less than the predetermined value in a predetermined number of successive comparisons. The monitoring conditions may include the vehicle engine running, air intake temperatures of the engine when starting and when operating being higher than or equal to a predetermined temperature, and the intake air temperature sensor not malfunctioning. In exemplary embodiments, the predetermined temperature may be about five degrees Celsius, the predetermined period about 320 seconds, the predetermined number of successive comparisons at least about five, and predetermined value about 0.0146 volts.

DETAILED DESCRIPTION OF THE EMBODIMENTS

Exemplary embodiments of the present invention will hereinafter be described in detail with reference to the accompanying drawings.

Figure 1:
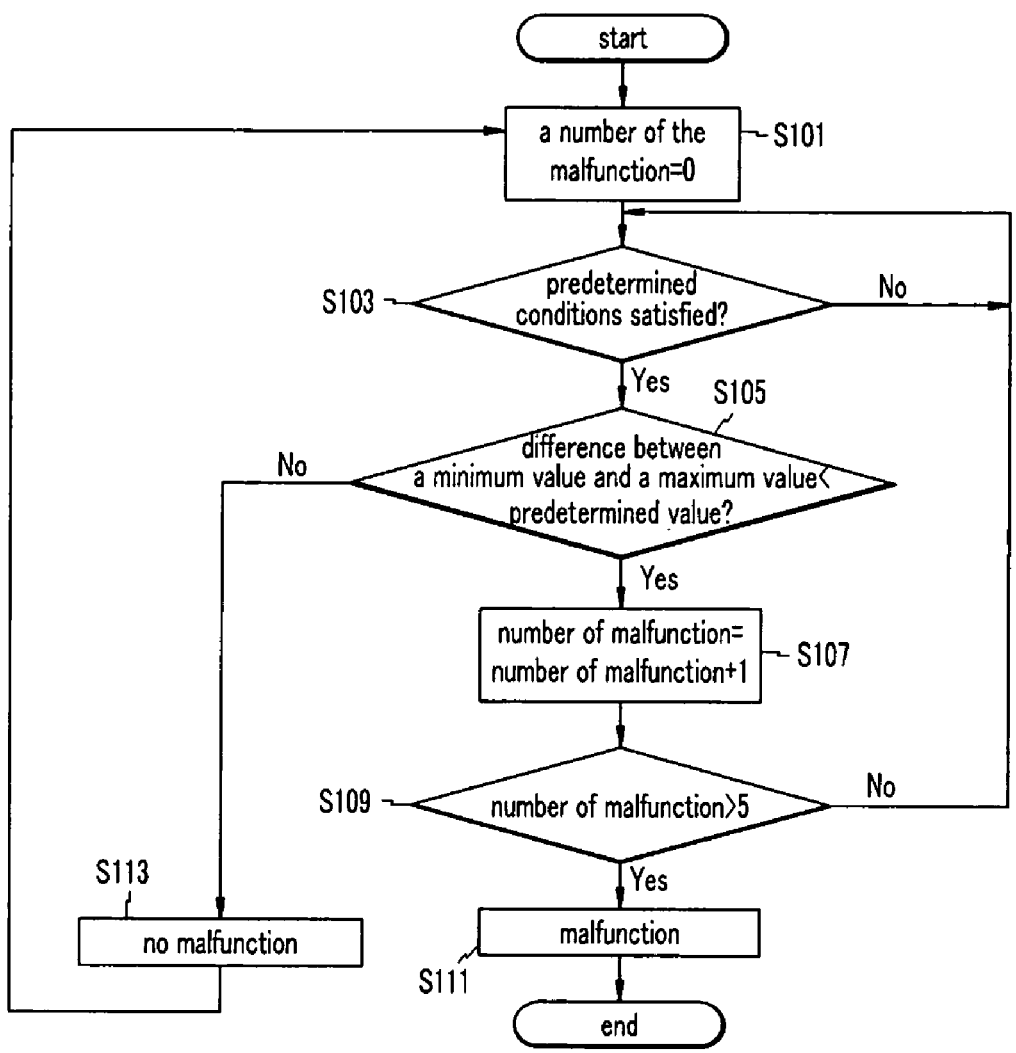
FIG. 1 is a flowchart showing a method for determining a malfunction of a pressure sensor according to an exemplary embodiment of the present invention.
Figure 2:
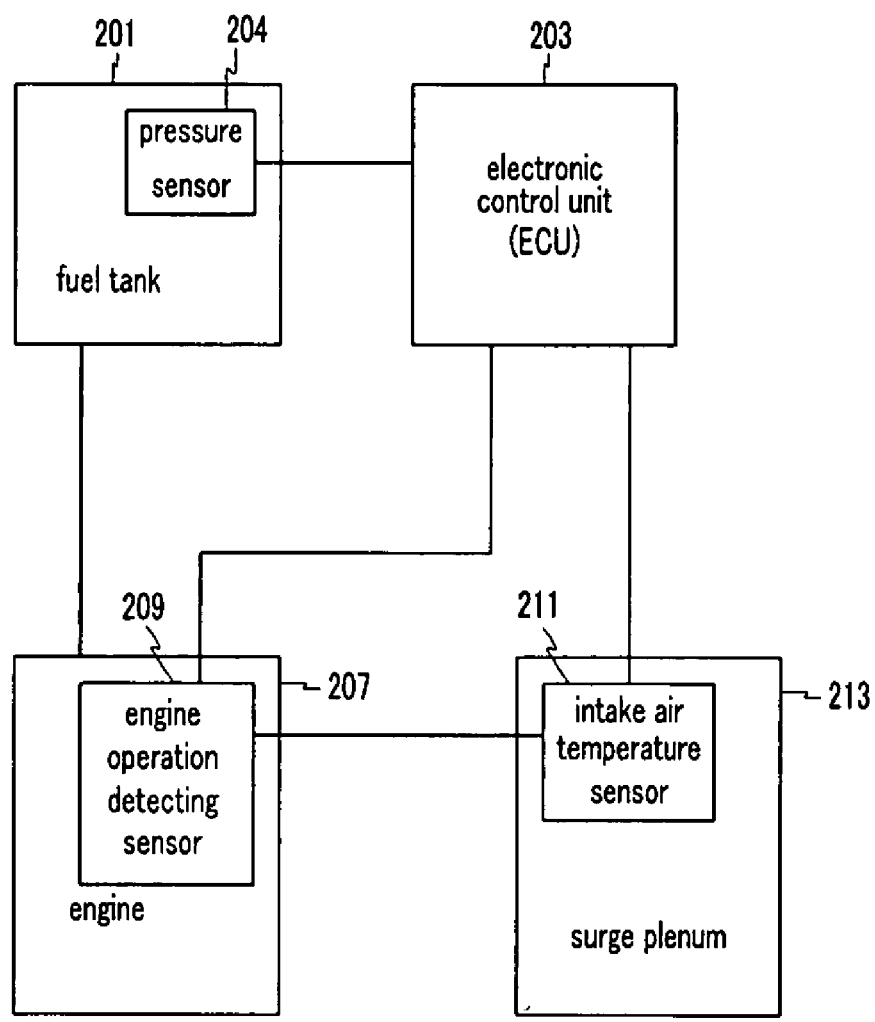
FIG. 2 shows a system which can perform a method for determining a malfunction of a pressure sensor according to an exemplary embodiment of the present invention.

As shown in FIG. 2, according to an exemplary embodiment of the present invention, a system that can perform the method for determining the malfunction of the pressure sensor includes a fuel tank 201, an electronic control unit (ECU) 203, an engine 207, a surge plenum 213, a pressure sensor 205, an engine operation detecting sensor 209, and an intake air temperature sensor 211.

The fuel tank 201 stores a fuel supplied to the engine 207 and the pressure sensor 205 is mounted in the fuel tank 201 and can detect a leakage of the fuel and a pressure of a fuel evaporation gas.

The engine operation detecting sensor 209 is mounted to the engine 207 and can detect an ignition of the engine in a case that the engine is started.

An intake air supplied to the engine 207 is temporarily stored in the surge plenum 213 and the intake air temperature sensor 211, which can measure a temperature of the intake air, is mounted to the surge plenum 213.

According to an exemplary embodiment of the present invention, the ECU that can perform the method for determining the malfunction of the pressure sensor determines the malfunction of the pressure sensor by receiving signals from the pressure sensor 205, the engine operation detecting sensor 209 and the intake air temperature sensor 211.

The ECU 203 may be realized by at least one microprocessor activated by a predetermined program and the predetermined program can be programmed to include a set of instructions to perform steps in a method according to an exemplary embodiment of the present invention, which will later be described in more detail. Memory and other hardware compounds may be selected and configured by a person of ordinary skill in the art.

According to an exemplary embodiment of the present invention, if the method is performed, the ECU 203 determines that the number of times of malfunction of the pressure sensor 205 is zero at step S101.

And then, at step S103, the ECU 203 determines whether predetermined monitoring conditions are satisfied.

The predetermined monitoring conditions include a case that an engine 207 has been started, a case that respective intake air temperatures when the engine 207 is starting and when the engine 207 is operating are higher than or equal to a predetermined temperature, and a case that malfunction of an intake air temperature sensor 211 does not exist.

That is, the ECU 203 determines whether the engine 207 is in a state that the engine 207 has been started, by receiving a signal from the engine operation detecting sensor 209.

In addition, the ECU 203 determines whether the intake air temperature when the engine 207 is starting and the intake air temperature when the engine 207 is operating are higher than or equal to the predetermined temperature by receiving signals from the engine operation detecting sensor 209 and the intake air temperature sensor 211.

At the step S103, in a case that the predetermined conditions are not satisfied, the step S103 is repeatedly performed.

According to an exemplary embodiment of the present invention, the intake air temperature may be 5° C. but is not limited thereto. The intake air temperature means a temperature at which a normal output value is output from the pressure sensor 205.

In addition, the ECU 203 determines a case that malfunction of the intake air temperature sensor 211 does not exist.

As described, if the monitoring conditions are satisfied at the step S103, the ECU 203 determines whether a difference between a maximum value and a minimum value of output values output from the pressure sensor 205 during a predetermined period is less than a predetermined value at step S105.

The predetermined value means a noise voltage value output from the pressure sensor 205. That is, the predetermined value is a difference between the minimum value and the maximum value of the voltage value that may be generated in a case that the pressure in the fuel tank is constant.

The output values are voltage values output from the pressure sensor 205 during the predetermined period and the ECU 203 distinguishes the minimum value and the maximum value of the voltage values and calculates the difference between them by detecting the voltage values.

According to an exemplary embodiment of the present invention, the predetermined value may be predetermined as 0.0146V, but is not limited thereto.

At the step S105, in a case that the difference between the minimum value and the maximum value is not less than the predetermined value, at step S113 the MCU 203 determines that there is no malfunction of the pressure sensor 205 and returns to the step S101.

In addition, according to an exemplary embodiment of the present invention, the predetermined period may be predetermined as 320 seconds, but is not limited thereto.

The predetermined period means a minimum period while the pressure of the fuel tank can be changed, and therefore the pressure can be changed during the predetermined period.

At the step S105, if the MCU 203 determines that the difference between the minimum value and the maximum value is less than the predetermined value, the MCU 203 determines that there is a malfunction of the pressure sensor 205 and counts a number of malfunctions (S107).

That is, because the difference value between the maximum value and the minimum value of the voltage output from the pressure sensor 205 is the predetermined value in the case that the pressure in the fuel tank is constant, if a value that is less than the predetermined value is calculated in spite of the pressure change, it is determined that a stick malfunction occurs.

In other words, at the step S107, the MCU 203 adds 1 to the number of malfunctions. In addition, at step S109 the MCU control unit 203 determines whether the number of malfunctions is over 5.

In addition, the MCU 203 returns to the step S103 in a case that the number of malfunctions is lower than 5.

Because a malfunction may frequently occur in the pressure sensor 204, if the number of malfunctions is over 5, at step S111, the MCU 203 determines that a malfunction occurs in the pressure sensor 204.

According to an exemplary embodiment of the present invention, in a case that a stick malfunction occurs in the pressure sensor mounted in the fuel tank, the stick malfunction can be detected.

In addition, because the fuel tank leakage can also be detected, an unnecessary lighting of an engine warning lamp can be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for determining a malfunction of a pressure sensor detecting a pressure in a fuel tank and outputting a corresponding signal, the method comprising:
   determining whether predetermined monitoring conditions are satisfied;
   determining whether a difference between a maximum value and a minimum value of output values output from the pressure sensor during a predetermined period is less than a predetermined value in a case that the predetermined monitoring conditions are satisfied; and
   determining that the pressure sensor is malfunctioning if a case that the calculated difference is less than the predetermined value successively occurs as much as a predetermined number of times;
   wherein the predetermined monitoring conditions comprise:
   a case that an engine has been started;

a case that respective intake air temperatures when the engine is starting and when the engine is operating are higher than or equal to a predetermined temperature; and a case that malfunction of an intake air temperature sensor does not exist.

2. A method for determining a malfunction of a pressure sensor in a vehicle fuel tank, comprising:

determining that predetermined monitoring conditions are satisfied;

determining a maximum value and a minimum value output by the pressure sensor during a predetermined period;

calculating a difference between said minimum and maximum values;

comparing said difference to a predetermined value; and determining that the pressure sensor is malfunctioning when said difference is less than the predetermined value in a predetermined number of successive comparisons;

wherein said predetermined monitoring conditions comprise:

the vehicle engine is running;

air intake temperatures of the engine when starting and when operating are higher than or equal to a predetermined temperature; and an intake air temperature sensor is not malfunctioning.

3. The method of claim 2, wherein the predetermined temperature is about five degrees Celsius.

4. The method of claim 2, wherein the predetermined period is about 320 seconds.

5. The method of claim 2, wherein the predetermined number of successive comparisons is at least about five.

6. The method of claim 2, wherein the predetermined value is about 0.0146 volts.

* * * * *